United States Patent [19]

Bakay

[11] 3,928,542

[45] Dec. 23, 1975

[54] PROCESS FOR THE PREPARATION OF ANION EXCHANGE RESIN FOR USE IN THE REDISTRIBUTION OF CHLOROSILANES

[75] Inventor: Carl James Bakay, Marietta, Ohio

[73] Assignee: Union Carbide Corporation, New York, N.Y.

[22] Filed: Apr. 5, 1974

[21] Appl. No.: 458,321

[52] U.S. Cl. .............................................. 423/342
[51] Int. Cl.² ...................................... C01B 33/08
[58] Field of Search.......... 423/342, 347; 260/2.1 R, 260/2.1 E

[56] References Cited
UNITED STATES PATENTS

| 2,834,648 | 5/1958 | Bailey et al. ......................... 423/342 |
| 2,853,475 | 9/1958 | Murphey.............................. 260/2.1 |

FOREIGN PATENTS OR APPLICATIONS

| 2,162,537 | 7/1972 | Germany ........................... 423/347 |

Primary Examiner—M. J. Andrews
Attorney, Agent, or Firm—George A. Skoler

[57] ABSTRACT

The process of this invention is directed to the treatment of solid anion exchange resin with dry hydrogen chloride to enhance the ability of the resin to redistribute chlorosilanes.

1 Claim, No Drawings

PROCESS FOR THE PREPARATION OF ANION EXCHANGE RESIN FOR USE IN THE REDISTRIBUTION OF CHLOROSILANES

This invention is concerned with the treatment of anion exchange resins to improve the processes described in copending U.S. patent application Ser. No. 152,587, filed on June 14, 1971, by Carl J. Litteral, and in copending U.S. patent application Ser. No. 445,667, filed on Feb. 25, 1974, by Carl J. Bakay, both commonly assigned.

The processes described in those applications relate to the disproportionation or redistribution of chlorosilicon hydrides, such as chlorosilanes, in contact with an anion exchange resin containing tertiary amino or quaternary ammonium groups to produce, in one instance, by a multistep process, dichlorosilane, monochlorosilane and silane, and by a single step process to produce, in another instance, silane alone.

This invention is concerned with an improvement of those processes which comprise pretreating the aforementioned anion exchange resin in an inert liquid with dry hydrogen chloride gas until approximately one equivalent of hydrogen chloride has been consumed in the bed and heat is no longer evolved by the bed. This treatment reduces the period of time by ½ to ¼ that which was previously required to effect a steady state disproportionation or redistribution of the chlorosilicon hydrides.

Though the process specified herein involves the pretreatment of an anion exchange resin with hydrogen chloride, it is to be understood that equivalent results are obtained when the pretreating gas is hydrogen bromide or hydrogen iodide. However, in view of the significantly lower cost of hydrogen chloride, it is the much preferred pretreating agent.

The amino ion exchange resins suitable for use in the practice of this invention are polymeric materials which are insoluble in silane, monochlorosilane, dichlorosilane, trichlorosilane, and silicon tetrachloride.

Such insolubility can be achieved, in the case of linear, thermoplastic ion exchange resins, by using a resin of sufficiently high molecular weight, viz. greater than about 10,000 such that the polymers possess the requisite insolubility. Insolubility can be achieved by employing a cross-linked ion exchange resin, such as one which is infusible as well. However, for the purposes of this invention, the degree of cross-linking need only be sufficient to meet the requisite insolubility requirements.

The amino functionality in the resin is preferably a tertiary amino or quaternary ammonium group attached through carbon to the resin structure. Preferably, other than the nitrogen atoms or the halide ions of the amino functionality, all of the resin is composed of carbon and hydrogen. However, this limitation does not exclude the presence of impurities in the resin which contain other atoms such as oxygen, phosphorus, iron, boron and the like. During the course of the reaction, it is believed that such impurities are leached to a substantial degree from the resin by passage of chlorosilicon hydride monomer through the resin thereby to produce a resin free of such impurities or the resin retains such impurities without contaminating the feed or reaction products.

Particularly preferred ion exchange resins are those made from the copolymerization of a monoolefinically unsaturated (halogenated or non-halogenated) hydrocarbons or a monoolefinically unsaturated heteroamine and a polyolefinically unsaturated hydrocarbon or polyolefinically unsaturated heteroamine. Illustrative of such monoolefinically unsaturated compounds are, for example, styrene, 4-chlorostyrene, 3-chlorostyrene, vinyltoluene, 4-chloromethylstryreme, vinylnaphthalene, vinylpyridine, 2-methyl-5-vinyl-pyridine, 2,3-dimethyl-5-vinylpyridine, 2-methyl-3-ethyl-5-vinylpyridine, 2-methyl-5-vinylquinoline, 4-methyl-4-vinylquinoline, 1-methyl- or 3-methyl-5-vinylisoquinoline, and the like.

The polyolefinically unsaturated compounds may be, for example, one of the following: 1,4-divinylbenzene, divinylpyridine, divinyltoluenes, divinylnaphthalenes, trivinylbenzene, trivinylnaphthalenes, and the polyvinylanthracenes.

Such copolymers are well known and a number of them are commercial products which possess amino functionality. They may be converted into crosslinked resins with conventional free radical addition catalysts such as peroxides. If the monomers employed contain tertiary amino groups, such as is the case with the pyridinyl compounds mentioned above, then it is not necessary to treat the copolymer to introduce the amino functionality. However, if the copolymer contains chloro groups (and is free of amine) then the amine can be formed by reacting the copolymer with, for example, ammonia, primary and secondary alkyl and/or aryl amines, to form the amine by condensation, where the by-product is HCl. In the preferred practice of this invention, the amine formed in this manner is the reaction product of a secondary amine, such as a dialkylamine, a diarylamine and/or an alkylarylamine, and the chlorinated resin.

Quaternization of the tertiary amine containing resin can be effected by reaction with a hydrocarbon halide such as an alkyl halide or aryl halide, to form the corresponding quaternary amine halide.

Amine anion exchange resins are available generally in two forms. One form is called a gel type resin and represents the standard type exchangers. The other form is called a macroreticular type anion exchange resin. The latter form possesses, within the particles, greater porosity for the passage of molecules. The gel type resins possess collapsed gel structures whereas the macroreticular resins possess a non-gel pore structure that is not collapsed. Such forms of the resins have been thoroughly described in the published literature, see, for example, JACS, vol. 84, January 20, 1962 at pages 305 and 306; *I and EC Product Research and Development*, vol. 1, No. 2, June 1962, at pages 140–144; *Polymer Letters* (1964) vol. 2, at pages 587–591; U.S. Pat. No. 3,037,052, patented May 29, 1962; and U.S. Pat. No. 3,367,889, patented Feb. 6, 1968. The latter patent is particularly pertinent with respect to the processes for producing a macroreticular tertiary amine ion exchange resin, see specifically Example IV therein.

Illustrative of a commercial macroreticular tertiary amine ion exchange resin is Amberlyst A-21, a trademark owned by, and which resin is produced by, Rohm and Haas Company, Philadelphia, Pennsylvania. It has the following physical properties.

| Appearance | Hard, spherical, light tan Water-saturated beads |
|---|---|
| Ionic form | Free base |
| Moisture holding capacity, percent | 45 to 53 |
| Exchange capacity: | |
| Weight capacity, meq./g. dry resin | 4.7 to 5.0 |
| Volume capacity, meq./ml. | 1.5 to 1.7 |
| Density, lbs./cu. ft. | 38 to 42 |
| Effective size, mm. | 0.40 to 0.55 |
| Uniformity coefficient | 2.0 maximum |
| Fines, by wet sieve analysis through No. 50 sieve, percent | 1.0 maximum |
| Hydraulic expansion, free base form at 2.0 gpm/cu. ft., 30°C, percent | 120 maximum |
| Whole bead content, percent | 100 |
| Porosity, percent | 35 to 45 |
| Average pore diameter A | 700 to 1200 |
| Surface area, m²/g. | 20 to 30 |
| Solids percent | 47 to 55 |
| Percent swelling from dry state to solvent-saturated state - | |
| Hexane | 20 |
| Toluene | 25 |
| Diethylether | 22 |
| Acetone | 22 |
| Absolute ethanol | 30 |
| Water | 25 |

These data were obtained using free base form resin previously conditioned for irreversible swelling by a two cycle alternate acid-caustic rinse treatment. Such swelling may amount to 10 to 15 percent.

Illustrative of a commercial macroreticular quaternary amine ion exchange resin is Amberlyst A-26 a trademark owned by, and which resin is produced by, Rohm and Haas Company, Philadelphia, Pennsylvania. It has the following physical properties:

| Appearance | Hard, spherical, light tan, water-saturated beads |
|---|---|
| Functional group | Quaternary Ammonium |
| Ionic form | Chloride |
| Moisture holding capacity, % | 61–65 |
| Ion exchange capacity: | |
| Weight capacity, meq./g | 4.1–4.4 |
| Weight capacity, meq./ml. | 0.95–1.1 |
| Density, lbs/ft.³ | 39–43 |
| Effective size, mm. | 0.45–0.55 |
| Uniformity coefficient | 1.8 maximum |
| Whole bead content, % | 100 |
| Average pore diameter A | 400–700 |
| Surface area, m²/g. | 25–30 |

Illustrative of a commercial gel type quaternary ammonium ion exchange resin is Amberlite IRA-400, a trademark owned by, and which resin is produced by, Rohm and Haas Company, Philadelphia, Pennsylvania. It has the following physical properties:

| Appearance | Hard, spherical, dark tan water saturated beads |
|---|---|
| Ionic form | Quaternary amine hydrochloride |
| Moisture Holding Capacity, % | 42–48 |
| Exchange Capacity | |
| Wt. Capacity, meq./g. dry resin | 3.8 |
| volume Capacity, meq./ml. | 1.4 |
| Density, lbs/cu. ft. | 38.0–45 |
| Effective size, mm | 0.38–0.45 |
| Uniformity Coefficient | 1.75 (max.) |
| Fines, by wet seive analysis through No. 50 sieve (U.S. Standard), percent | <2.0 (max.) |
| Whole bead content, percent | 100 |
| mean pore, diameter, Angstroms | none |
| Swelling, conversion from chloride to hydroxide form, % | 18–22 |

The aforementioned resins are predicated upon styrene and divinylbenzene copolymers which are chloromethylated on the styrene ring followed by amination to produce the desired amine exchange functionality. Further alkylation as described above can be employed to produce the corresponding quaternary ammonium derivatives.

In the most desirable practice of this invention, the tertiary amine or quaternary ammonium groups are dialkyl amino, or alkyl phenyl or diphenyl or dicycloalkyl or alkylcycloalkyl, or further alkylated derivatives of the above to the quaternary derivative, where each alkyl contains one to about 18 carbon atoms and the cycloalkyl contains about 4 to about 8 carbon atoms. The most preferred tertiary amino or quaternary ammonium functional groups are those which are the alkylamino or alkylammonium wherein each alkyl thereof contains one to about 8 carbon atoms.

The above described resins are particulate and in this form can be employed to disproportionate the chlorosilicon hydrides feed by passing liquid or vapors of chlorosilicon hydrides through a bed of such particles.

The disproportionation process may be practiced at temperatures as low as about 0°C., to as high as about 350°C., though the preferred operating temperatures are typically about 20°C. to about 200°C.

The process of this invention, as characterized above, can be carried out as a liquid phase process or as a vapor phase process. Surprisingly, the maximum equilibrium that one can achieve by such disproportionation reactions is attained more rapidly in a vapor phase disproportionation reaction as compared to a liquid phase reaction. Hence, for commercial utilization of this process, a vapor phase reaction will probably be preferred.

The process may be carried out under subatmospheric, atmospheric or superatmospheric pressure. Pressure plays a practical role in the utilization of this process as a mechanism for controlling the state of the feed material and disproportionation products during conduct of the reaction. It is not, however, a critical factor to the operability of this process. For example, if one wishes to operate the process at 60°C. at the initial reflux in the liquid phase rather than the vapor or gas phase, certain considerations must be made. For example, at 60°C., silane, monochlorosilane, trichlorosilane, dichlorosilane, and silicon tetrachloride are vaporized at atmospheric pressure and therefore pressure must be applied in order to maintain a liquid phase process in which these materials are present. However, the term "liquid phase process" does not mean that all of the products of the disproportionation reaction and the monomer feed are in the liquid phase. All that is necessary for a liquid phase reaction is that at least one of such products be liquid under conditions of operation.

Another element of the process is the "contact time" or rather the "residence time" between the resin and the feed materials. For each temperature employed, there is an independent period of time in which such monomer feed should be in contact with the anion exchange resin to reach ultimate equilibrium. The mole per cent of the desired or favored disproportionated product is dependent upon the process temperature, where higher temperatures generally yield higher mole per cent quantities of such product, and the contact time. However, if it is desired to achieve partial disproportionation and, hence, achieve less than the equilibrium of such disproportionation, then a shorter contact time will be favored.

In pretreating the resin, the resin is dispersed within an inert liquid, such as a hydrocarbon, halogenated hydrocarbon, and the like, which is desirably water immiscible so as to keep the bed dry during treatment. Illustrative of suitable hydrocarbon and halogenated hydrocarbon inert liquids are, for example, hexane (normal and iso-), heptane (normal and iso-), octane (normal and iso's-) nonane (normal and iso's-), dodecane (normal and iso's-), mineral spirits, kerosene, benzene, toluene, xylene, cyclohexane, and the like, trichlorothylene, perchloroethylene, perfluoroethylene, 1-chloro-n-butane, and the like.

The anion exchange resin may be in the form of a fixed bed or loosely suspended in the liquid for treatment with the hydrogen chloride gas. The gas is bubbled into the resin-liquid combination so that there is sufficient take up of hydrogen chloride basis the equivalent weight of amino groups in the resin. Thereafter, the bed may be treated by repeated washings with the inert liquid and followed by heating to remove the last traces of inert liquid, if desired. It is important that the hydrogen chloride the anhydrous, that is, not contain more than about one weight per cent water, and preferably, it should be totally anhydrous. Pretreatment of anion exchange resins with hydrochloric acid, that is, hydrogen chloride dissolved in water, followed by azeotroping the mixture to dryness, results in a completely inactive catalyst. From this, it can be concluded that the amino-hydrogen chloride complex must be formed in an anhydrous medium such as between the dry resin, the inert liquid and dry hydrogen chloride gas in order to form an effective and superior catalyst.

EXAMPLE 1

Approximately 100 grams of Amberlyst A-21 resin, damp as supplied by the manufacturer, is added to a round bottomed boiling flask fitted with a thermometer, Dean-Stark trap and water-cooled condenser. To this is added 500 grams toluene, and the mixture is brought to reflux. Water is removed via a toluene-water azeotrope, at the end of which the resin is anhydrous (less than 1 weight per cent water). The dried resin in toluene is transferred as a slurry to a conical flask fitted with a fitted glass sparge tube and thermometer, and dry hydrogen chloride is bubbled through the slurry at 1 liter/minute. The reaction is complete in ½ to 1 hour with a modest evolution of heat and a resin color change from amber to dark gray. The HCl treatment is continued for 4 hours. The product is washed with several volumes of toluene and stored as a slurry. Gravimetric studies on a dried portion of resin before and after this treatment indicates a weight increase of 1.2 equivalents of HCl for each dimethylamine equivalent on the resin. The same procedure is repeated in the treatment of an A-26 resin.

EXAMPLE 2

To evaluate these resins as disproportionation catalysts, 15 cubic centimeters of a slurry of the resins prepared in Example 1, corresponding to 11 grams dry resin weight, are charged to a water jacketted Pyrex reactor of 20 cubic centimeters internal volume (1 centimeter by 25 centimeters in length). Trichlorosilane is added to a 500 cubic centimeter stainless steel feed tank, which is then pressurized with 26 psig $N_2$ and connected to the bottom of the reactor. Flow in the reactor is controlled by a needle valve below the resin bed, dropping the feed pressure to ambient, and the effluent reaction product is sampled immediately for analysis by gas liquid chromatography. A dry ice-acetone cooled condenser is used to trap any volatilized dichlorosilane.

During continuous operation of this reactor with 99.9 weight per cent pure trichlorosilane feed at 20 ± 1°C resin bed temperature and at atmospheric pressure, the system is run for an initiation time of 3–4 hours to remove toluene traces from the resin and reach constant product composition. Then, samples of effluent are taken while the flow is varied from 2.2 to 0.5 ml/min., changing the contact time from 5 to 40 minutes, respectively. As shown in Tables I and II, gaseous HCl treated resin is a more effective catalyst in producing $H_2SiCl_2$ from $HSiCl_3$ than dry (anhydrous) untreated resin used in the same way as described above.

EXAMPLE 3

To 50 grams of damp (50 weight per cent water) Amberlyst A-21 resin (as supplied by the manufacturer) in a beaker is rapidly added 110 g. of 38 per cent hydrochloric acid with stirring. The slurry is poured into a separatory funnel, stoppered and shaken. There follows an exothermic temperature rise from 25° to 46°C and a physical darkening of the resin. Cooled to 40°C, the mixture is decanted of excess aqueous HCl and poured into a round bottomed boiling flask fitted with thermometer, Dean-Stark trap and water cooled condenser. Then 150 grams of toluene are added and the mixture is brought to boiling. A toluene-water azeotrope is removed at 91°–92°C at 752 mm.Hg. until the resin slurry is essentially water free, and pure toluene distilled over at 108°C at 752 mm.Hg. The product is cooled and stored as a toluene slurry until use as in Example 2 and the results are depicted in Table I.

TABLE I

REDISTRIBUTION OF LIQUID $HSiCl_3$ BY A-21 RESIN

| Liquid Contact Time Minutes | Crude Composition (Mole %) | | | |
|---|---|---|---|---|
| | $H_3SiCl$ | $H_2SiCl_2$ | $HSiCl_3$ | $SiCl_4$ |
| A. Untreated Resin (No HCl Treatment) | | | | |
| 5.2 | — | 1.4 | 97.1 | 1.5 |
| 10.3 | Trace | 3.0 | 93.8 | 3.2 |
| 20.5 | 0.04 | 4.5 | 90.2 | 5.3 |
| 37.8 | — | 6.0 | 87.8 | 6.2 |
| B. Gaseous Anhydrous HCl-Treated Resin | | | | |
| 5.0 | Trace | 4.3 | 91.3 | 4.4 |
| 8.1 | Trace | 5.5 | 88.5 | 6.0 |
| 12.0 | 0.1 | 5.8 | 87.1 | 7.1 |
| 31.5 | 0.1 | 7.6 | 83.9 | 8.5 |
| C. Aqueous HCl-Treated Resin (Example 3) | | | | |
| 9.9 | N.D.* | N.D.* | 99.9 | 0.1 |
| 10.0 | N.D.* | N.D.* | 99.9 | 0.1 |

*N.D. means non-detectible

TABLE II

REDISTRIBUTION OF LIQUID $HSiCl_3$ BY A-26 RESIN

| Liquid Contact Time Minutes | Crude Composition (Mole %) | | | |
|---|---|---|---|---|
| | $H_3SiCl$ | $H_2SiCl_2$ | $HSiCl_3$ | $SiCl_4$ |
| A. Untreated Resin | | | | |
| 9.3 | N.D.* | 2.2 | 95.3 | 2.5 |
| 10.1 | N.D.* | 2.1 | 94.0 | 3.9 |
| B. Gaseous HCl-Treated Resin | | | | |
| 9.0 | N.D.* | 3.4 | 93.2 | 3.4 |
| 9.2 | N.D.* | 2.7 | 93.9 | 3.4 |

*N.D. means non-detectible

What is claimed is:

1. In the process of disproportionation or redistribution of trichlorosilane, dichlorosilane or monochlorosilane in an amino anion exchange resin bed at a temperature of between about 100°C. to as high as about 350°C., by feeding said silanes to said anion exchange resin bed, the improvement which comprises pretreating said bed in an inert water immiscible liquid with anhydrous hydrogen chloride until at least one equivalent thereof is taken up by said bed.

* * * * *

UNITED STATES PATENT OFFICE
CERTIFICATE OF CORRECTION

Patent No. 3,928,542              Dated December 23, 1975

Inventor(s) Carl James Bakay

It is certified that error appears in the above-identified patent and that said Letters Patent are hereby corrected as shown below:

Column 2, line 10, "4-chloromethylstyreme" should read -- 4-chloromethylstyrene --.

Signed and Sealed this

*twenty-ninth* Day of *June 1976*

[SEAL]

Attest:

RUTH C. MASON
*Attesting Officer*

C. MARSHALL DANN
*Commissioner of Patents and Trademarks*